United States Patent [19]

Fernström

[11] 4,268,233
[45] May 19, 1981

[54] HAND HELD ROTARY MACHINE TOOL WITH VIBRATION INSULATING MEANS
[75] Inventor: Harry G. Fernström, Saltsjö-Boo, Sweden
[73] Assignee: Atlas Copco Aktiebolag, Nacka, Sweden
[21] Appl. No.: 39,294
[22] Filed: May 15, 1979
[30] Foreign Application Priority Data
  May 16, 1978 [SE] Sweden .............................. 7805546
[51] Int. Cl.³ ........................ F01C 13/02; F01C 21/02
[52] U.S. Cl. ................... 418/270; 308/143; 308/145; 308/230; 308/233
[58] Field of Search .................. 418/270; 51/134.5 F, 51/170 R, 170 PT, 170 T; 308/143, 145, 230, 233; 173/163

[56] References Cited
U.S. PATENT DOCUMENTS 3,218,028 11/1965 Borden .............................. 415/503
4,140,446 2/1979 Fernstrom et al. ................ 418/270
4,177,024 12/1979 Lohn ................................. 418/270

FOREIGN PATENT DOCUMENTS 17886 5/1935 Australia ............................ 308/230

Primary Examiner—John J. Vrablik
Attorney, Agent, or Firm—Frishauf, Holtz, Goodman and Woodward

[57] ABSTRACT

A hand held machine tool intended for grinding and like operations, having an outer housing containing a pneumatic vane motor by which a tool carrying spindle is rotated. At its forward end, the motor is supported in the housing by at least one resilient O-ring for absorbing radial vibrations arising in the spindle during work and a conical thrust ball bearing for transferring axial load to the housing without restraining the radial resiliency provided by the at least one O-ring. At its rear end, the motor is supported in the housing by a substantially non-resilient O-ring, which means that the motor is apt to perform a pendular movement about its rear end when exposed to vibrations from the spindle.

11 Claims, 3 Drawing Figures

HAND HELD ROTARY MACHINE TOOL WITH VIBRATION INSULATING MEANS

BACKGROUND OF THE INVENTION

The present invention relates to a hand held machine tool intended for grinding and like operations.

In particular, the invention concerns a machine tool having a housing and a motor attached thereto for rotating a tool carrying output spindle. The motor is supported by the housing via a forward bearing unit including resilient means for absorbing radial displacements due to spindle vibrations and a rear bearing unit substantially non-resilient to radial displacement of the spindle.

Previous machines of this type have been effective in reducing the vibrations transferred to the housing or base structure but they have not been suitable for use as hand held tools. The main reason for that is their comparatively high weight and large outer dimensions due to separation of the output spindle and the rotor of the drive motor. Another reason is that their forward bearing means have not been able to transfer axial load and at the same time provide a low spring constant resiliency to radial vibrations.

The above problems are solved by the present invention which is intended to accomplish a vibration insulated machine tool suitable for use in hand held tool applications.

BRIEF DESCRIPTION OF THE DRAWINGS

FIG. 3 shows, in larger scale, a modified forward bearing means for the machine of FIG. 1.

Figure 1:
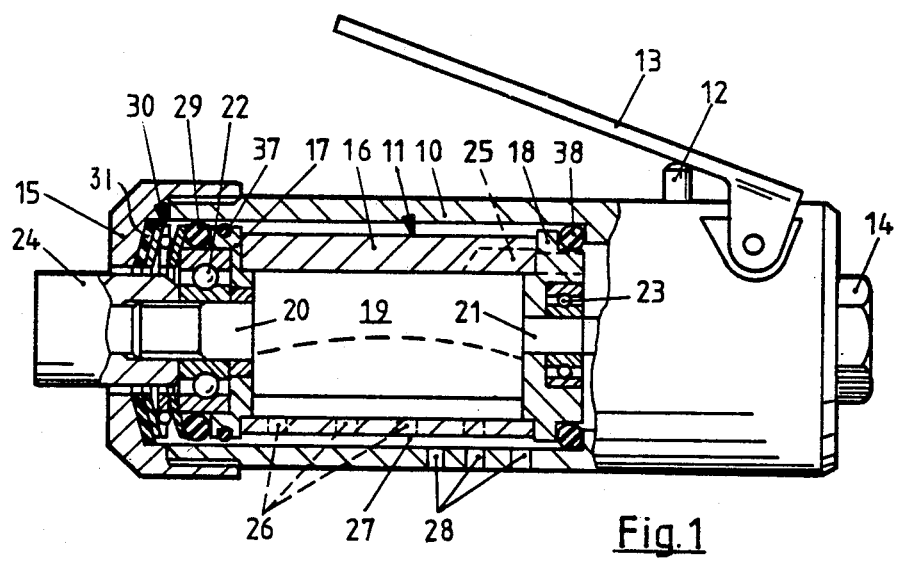
FIG. 1 shows a partly broken side elevation of a pneumatically powered machine tool according to the invention.
Figure 2:
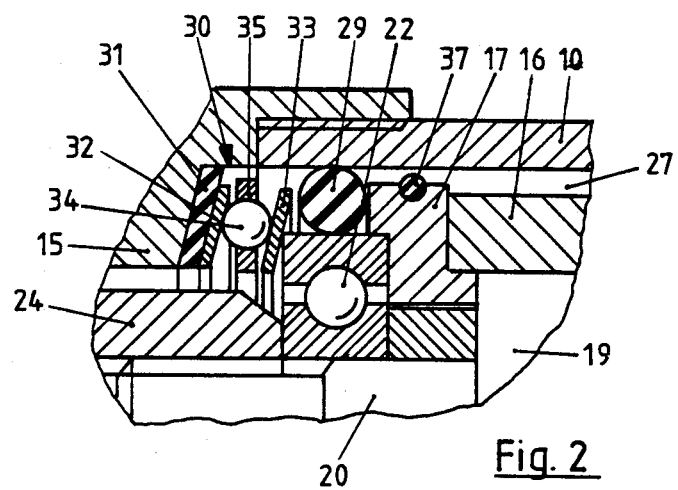
FIG. 2 shows, in larger scale, the forward bearing means of the machine in FIG. 1.

The machine tool shown in FIGS. 1 and 2 comprises a housing 10, a pneumatic vane motor 11 mounted in the housing 10, a pressure air supply valve 12 controlled by a lever 13 pivotally mounted on the housing 10, and a nipple 14 for connection of a pressure air supply conduit. At its forward end, the housing 10 is closed by an end cap 15.

The pneumatic vane motor 11 comprises a stator or cylinder 16, a forward end plate 17, a rear end plate 18 and a rotor 19. The latter supports a number of sliding vanes in a conventional manner and is provided with a forward stub axle 20 and a rear stub axle 21 to be journalled in the end plates 18 and 19 by means of ball bearings 22 and 23, respectively. The forward stub axle 20 carries a chuck 24 to which a working tool, such as a grinding disc, is connectable.

The motor 11 further comprises an air inlet passage 25 extending through the rear end plate 18 for communicating pressure air from the supply valve 12 to the cylinder 16. The latter is provided with radial outlet openings 26 for discharging exhaust air into an annular space 27 between the cylinder and the housing. The housing 10 is provided with a number of outlet openings 28 as well to pass exhaust air out of the machine.

At its forward end, the motor 11 is supported relative to the housing 10 by a resilient O-ring 29 and a conical axial thrust ball bearing 30. Between the latter and the end cap 15 of the housing 10, there is a resilient ring 31 the main purpose of which is to prevent high frequency noise vibrations from being transmitted to the housing.

The thrust bearing 30 comprises two conical rings 32, 33 formed with opposite even or ungrooved surfaces between which a number of balls 34 are kept by means of an apertured spacer ring 35. The motor 11 rests axially on the thrust bearing 30 via the outer race of the ball bearing 22. See FIG. 2.

Since the surfaces of the conical rings 32,33 are even, i.e., ungrooved, the balls 34 are free to move in any direction thereon, which in turn means that radial movement of the forward end of the motor 11 is restricted only by the resilient O-ring 29.

To avoid metallic contact between the motor 11 and the housing 10 at severe vibrations, there is provided another resilient O-ring 37 of smaller diameter than O-ring 29. O-ring 37 is mounted on the periphery of the forward end plate 17 and is adapted to assist O-ring 29 at large amplitude vibrations only.

At its rear end, the motor 11 is supported relative to the housing 10 by means of an O-ring 38. The latter is arranged to transfer radial as well as axial load between the motor 11 and the housing 10. Another purpose of O-ring 38 is to seal off the rear, pressure air supplied part of the housing 10 from the vented exhaust space 27 between the cylinder 16 and the housing. Due to the fact that the O-ring 38 is deformed when exposed to the air pressure, substantially no further resiliency is available in the O-ring 38 for admitting radial movement of the rear end of the motor.

The air pressure acting on the rear end plate 18 of the motor 11 generates an axial load acting on the motor. The resilient O-ring 29, however, is prevented from being exposed to this load and from being predeformed as O-ring 38. Instead the axial load is transferred to the housing 10 via the thrust bearing 30.

So, due to different load conditions in the O-rings 29 and 38, the radial resiliency at the forward end of the motor is completely different from that at the rear end of the motor. This means that, when exposed to radially acting vibration forces, the entire motor 11 will move like a pendulum having its fulcrum at the rear end of the motor. The forward O-ring 29 will permit radial movement, whereas the rear O-ring 38 will not, and, in order to facilitate pendular movement of the motor, the thrust ball bearing 30 is conical, i.e., the ball races are formed by conical rings 32,33.

According to another embodiment of the invention illustrated in FIG. 3, the ball races 32',33' are sphericl such that the ungrooved forward race 32' is concave and the rear ungrooved race 33' is convex relative to the balls 34. The radius of the spherical ball race surfaces is about equal to the length of the motor 16–19. This means that the center of the sphere of the ball races will be located at or near the intersection point of the longitudinal axis of the rotor and a transverse plane extending through the O-ring 38. An important characteristic of the invention is that the movement pattern of the tool carrying spindle of the machine is substantially limited to a pendular movement having its fulcrum at the rear end of the spindle. By such a spindle arrangement, the number of obtainable resonance frequencies are reduced, and, because of that, the elimination of unhealthy vibrations in the machine housing is facilitated.

I claim:

1. In a hand held machine for grinding and like operations, comprising:
   a housing (10); a motor (16–19) mounted in the housing (10) and rotating a tool carrying spindle (19–21, 24), said motor (16–19) including a rotor (19) and a stator (16); a forward bearing means (22, 29, 30) between the housing and the motor, and including a vibration insulating means (29) which is resilient to radial displacement of the spindle (19–21, 24); and a rear bearing means (23, 38) between the housing and the motor, and which is substantially non-resilient to radial spindle displacement, the improvement wherein:

said tool carrying spindle is rigid and mainly formed by the rotor (19) of the motor (16–19);

said vibration insulating means (29) comprises at least one resilient element located between the housing (10) and the stator (16) of the motor (16–19); and said forward bearing means (29, 30) includes an axial thrust bearing (30) arranged to transfer axial load between the stator (16) and the housing (10) substantially without applying said axial load to said at least one resilient element and to permit a universal radial displacement of the forward end of the stator (16) relative to the housing (10) notwithstanding the magnitude of the axial load on the motor, said axial thrust bearing (30) comprising a ball bearing having balls (34) and ungrooved ball races (32, 33) so as to permit a universal displacement of the balls (34) relative to the ball races (32, 33).

2. Machine tool according to claim 1, wherein the motor (16–19) comprises a pneumatic vane motor.

3. The machine tool of claim 1, wherein the ball races (32, 33) of said ball bearing (30) are conical.

4. The machine tool of claim 1 or 3 wherein the ball races of the ball bearing (30) have substantially flat surfaces on which the balls (34) bear.

5. The machine tool of claim 1, wherein the ball races of said ball bearing are generally spherical, the forward race (32') being concave and the rear race (33') being convex relative to the balls of the ball bearing.

6. The machine tool of claim 1, wherein said at least one resilient element comprises at least one O-ring (29).

7. The machine tool of claim 6, wherein said vibration insulating means comprises two resilient O-rings (29,37), the first of said O-rings (29) being mounted forward of the second O-ring (37) in the axial direction of the motor.

8. The machine tool of claim 7, wherein said first O-ring (29) has a larger diameter than that of said second O-ring (37), said second O-ring (37) assisting said first O-ring (29) in accommodating large amplitude vibrations only.

9. In a hand held machine tool for grinding and like operations, comprising:

a housing (10); a motor (16–19) mounted in the housing (10) and rotating a tool carrying spindle (19–21, 24), said motor (16–19) including a rotor (19) and a stator (16); a forward bearing means (22, 29, 30) between the housing and the motor, and including a vibration insulating means (29, 37) which is resilient to radial displacement of the spindle (19–21, 24); and a rear bearing means (23, 38) between the housing and the motor, and which is substantially non-resilient to radial spindle displacement, the improvement wherein:

said tool carrying spindle is rigid and mainly formed by the rotor (19) of the motor (16–19);

said vibration insulating means (29, 37) comprises two resilient O-rings (29, 37) located between the housing (10) and the stator (16) of the motor (16–19), the first of said O-rings (29) being mounted forward of the second O-ring (37) in the axial direction of the motor, and said first O-ring (29) having a larger diameter than that of said second O-ring (37), said second O-ring (37) assisting said first O-ring (29) in accommodating large amplitude vibrations only; and said forward bearing means (29, 30) includes an axial thrust bearing (30) arranged to transfer axial load between the stator (16) and the housing (10) substantially without applying said axial load to said vibration insulating means and to permit a universal radial displacement of the forward end of the stator (16) relative to the housing (10) notwithstanding the magnitude of the axial load on the motor.

10. The machine tool of claim 9, wherein said axial thrust bearing comprises a ball bearing having balls (34) and ball races (32, 33) having substantially flat ungrooved surfaces on which said balls (34) bear.

11. The machine tool of claim 9, wherein said axial thrust bearing comprises a ball bearing having balls (34) and ball races (32, 33) having generally spherical ungrooved surfaces on which said balls (34) bear.

* * * * *